Sept. 30, 1924.  
J. H. THOMPSON  
1,510,352  
DRIVING HEAD FOR DYEING MACHINES  
Filed March 29, 1924

Inventor-  
James H. Thompson.  
by his Attorneys.

Patented Sept. 30, 1924.

1,510,352

UNITED STATES PATENT OFFICE.

JAMES H. THOMPSON, OF TRENTON, NEW JERSEY, ASSIGNOR TO HUSSONG DYEING MACHINE COMPANY, OF GROVEVILLE, NEW JERSEY, A CORPORATION OF NEW JERSEY.

DRIVING HEAD FOR DYEING MACHINES.

Application filed March 29, 1924. Serial No. 702,796.

*To all whom it may concern:*

Be it known that I, JAMES H. THOMPSON, a citizen of the United States, residing in Trenton, Mercer County, New Jersey, have invented certain Improvements in Driving Heads for Dyeing Machines, of which the following is a specification.

My invention relates to certain improvements in the driving heads of dyeing machines, in which the dye liquid is circulated in the dye vat—first in one direction and then in the opposite direction.

One object of the invention is to design the head so that the several shafts are rigidly supported by a substantial frame and the main driving mechanism is located in a central position in respect to the propeller shafts.

A further object of the invention is to design the driving head so that the drive chain and its sprocket wheels are located in an oil-tight casing, independent of the casings enclosing the gearing and bearings of the driving head.

Figure 1:
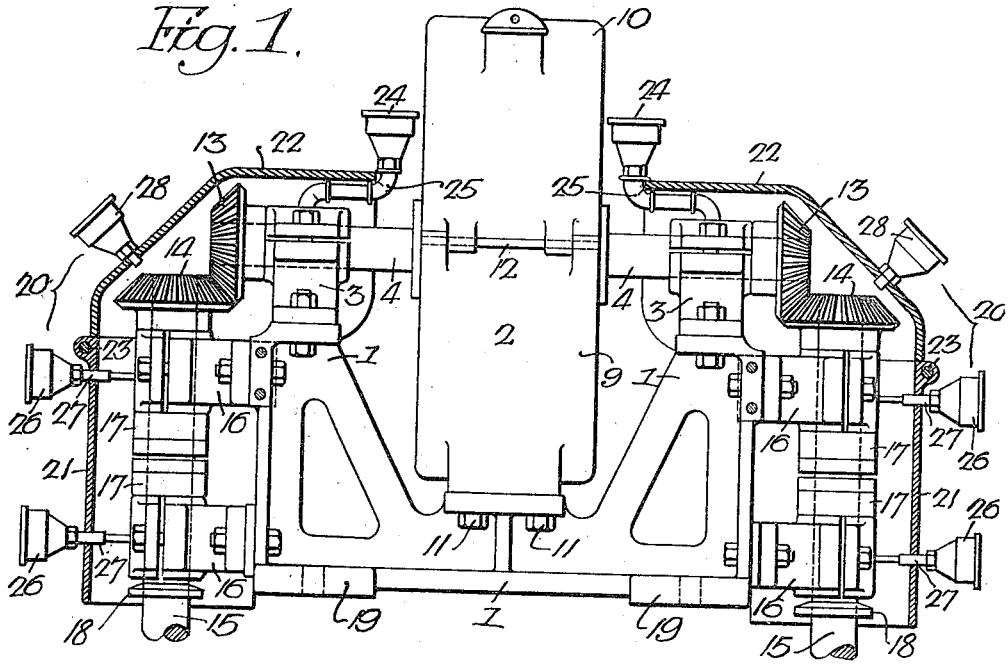
Figure 2:
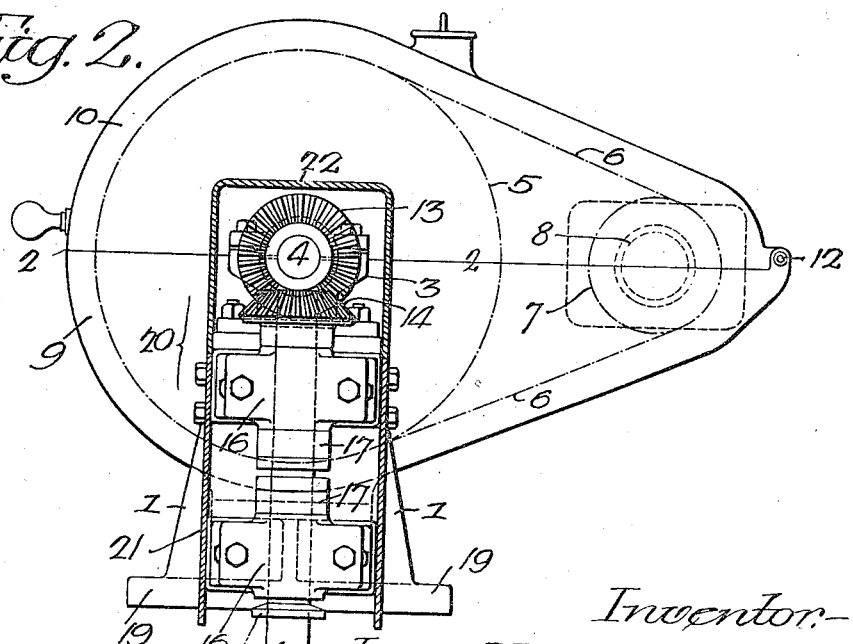

In the accompanying drawings:

Fig. 1 is a view in elevation of the improved driving head, the casings for the gearing and bearings being in section; and Fig. 2 is an end view of the head with one of the side casings in section.

The frame 1 of the driving head is made in a single piece, recessed at the center for the drive chain casing 2. Mounted in the bearings 3, secured to the upper portion of the frame 1, is a driven horizontal shaft 4. A bearing 3 is located on each side of the casing 2. On the shaft 4 within the casing 2 is a sprocket wheel 5. A drive chain 6 passes around the sprocket wheel 5 from a sprocket pinion 7 on a drive shaft 8, shown by dotted lines in Fig. 2. The casing 2, enclosing the drive chain, is made in two parts 9 and 10. The part 9 is fixed, being secured by bolts 11 to the central portion of the frame 1. The part 9 forms a receptacle for oil. The part 10 is hinged to the part 9 at 12 and can be turned back on the hinge to expose the drive chain.

On each side of the shaft 4 is a bevel gear wheel 13, which meshes with a like wheel 14, on a vertical propeller shaft 15, which is mounted in bearings 16, bolted to the frame 1. On each propeller shaft 15 are thrust roller bearings 17—17, of any standard type. The two roller bearings are located between the bearings 16—16. One roller bearing takes the downward pressure and the other roller bearing takes the upward pressure.

On each propeller shaft 15, below the lower bearing 16, is an oil collar 18, which prevents any lubricating oil running down the shaft from the bearings. Such a construction is substantial, as all the bearings are located in the main frame 1, which has extended feet 19 through which pass the bolts that secure the frame to the vat.

The gearing on the shafts is enclosed in casings 20, which are made in two parts 21 and 22. The part 21 is fixed and the part 22 is hinged to the part 21 at 23. By this construction, the hinged part 22 can be turned back to expose the gearing and the upper bearings. Grease cups 24 are connected by tubes 25 to the upper bearings 3—3. Grease cups 26 are connected through tubes 27, which extend through the part 21 of the casing 20, to the bearings 16—16, while grease cups 28 are so located as to supply the gears 14 with lubricant.

From the construction hereinbefore described, it will be seen that the working parts are enclosed and can be supplied with lubricant at all times.

I claim:

1. The combination in a driving head for dyeing machines, of a frame recessed at the center; upper bearings on the frame, one at each side of the recess; a horizontal shaft mounted in the bearings; bearings secured to each side of the frame; vertical shafts mounted in the bearings; gearing by which the vertical shafts are driven from the horizontal shaft; a sprocket wheel on the horizontal shaft; a drive shaft having a drive chain passing around the sprocket wheel; and a casing secured to the frame and enclosing the chain driving mechanism.

2. The combination in a driving head for dyeing machines, of a frame recessed at the center; two bearings on the upper portion of the frame, one at each side of the recess; a horizontal shaft mounted in the bearings; two bearings secured to each side of the frame; vertical shafts mounted in said side bearings; two roller thrust bearings on each vertical shaft between the side bearings; bevel gear wheels through which the vertical shafts are driven from the horizontal shaft; a sprocket wheel on the horizontal shaft; a casing enclosing said wheel and its drive chain, said casing being secured to the frame; and side casings enclosing the shafts and gears, said casings being made in two parts, the lower part being fixed and the upper part being movable.

3. The combination in a driving head for dyeing machines, of a frame recessed at the center; a casing located in the recess, said casing being made in two parts, the upper part being movable; means for securing the lower part of the casing to the frame; two bearings on the frame, one on each side of the casing; a horizontal shaft mounted in the bearings and extending through the casing; a sprocket wheel on the shaft within the casing; a drive chain for said sprocket wheel; vertical shafts mounted in the said bearings; bevel gears through which the vertical shafts are driven from the horizontal shaft; and two-part casings enclosing the frame on each side of the casing for the sprocket wheel, the upper part of each side casing being hinged to the lower part.

JAMES H. THOMPSON.